(12) United States Patent
Kakai et al.

(10) Patent No.: US 7,611,311 B2
(45) Date of Patent: Nov. 3, 2009

(54) TOOL FOR CHIP REMOVING MACHINING AS WELL AS A PART AND THREADED JOINT THEREFOR

(75) Inventors: Isak Kakai, Gävle (SE); Ralf Lehto, Gävle (SE); Kenneth Larsson, Sandviken (SE); Magnus Örtlund, Stockholm (SE)

(73) Assignee: Sandvik Intellectual Property AB, Sandviken (SE)

( * ) Notice: Subject to any disclaimer, the term of this patent is extended or adjusted under 35 U.S.C. 154(b) by 83 days.

(21) Appl. No.: 11/785,742

(22) Filed: Apr. 19, 2007

(65) Prior Publication Data

US 2007/0248421 A1    Oct. 25, 2007

(30) Foreign Application Priority Data

Apr. 20, 2006  (SE) .................................... 0600875

(51) Int. Cl.
*B23C 5/22* (2006.01)
*B23B 31/11* (2006.01)
*B23B 51/00* (2006.01)

(52) U.S. Cl. .................. 407/54; 408/233; 408/226; 408/239 R; 279/8

(58) Field of Classification Search ............... 407/30, 407/33, 34, 42, 53, 54, 46, 118; 408/226, 408/233, 231, 238, 239 R; 279/8; *B23B 51/00, B23B 31/11; B23C 5/22*
See application file for complete search history.

(56) References Cited

U.S. PATENT DOCUMENTS

| | | | | |
|---|---|---|---|---|
| 1,407,335 | A | * | 2/1922 | Reynolds et al. ............... 285/85 |
| 2,328,602 | A | * | 9/1943 | Bechler ....................... 403/333 |
| 3,047,316 | A | * | 7/1962 | Wehring et al. .............. 285/334 |
| 3,586,353 | A | | 6/1971 | Lorenz et al. |
| 4,828,294 | A | * | 5/1989 | Bounie et al. ................ 285/334 |
| 5,114,286 | A | | 5/1992 | Calkins |
| 5,496,137 | A | * | 3/1996 | Ochayon et al. ............. 408/226 |
| 5,598,751 | A | * | 2/1997 | Ochayon et al. ............ 76/108.6 |
| 5,971,670 | A | | 10/1999 | Pantzar et al. |
| 6,030,004 | A | | 2/2000 | Schock et al. |

(Continued)

FOREIGN PATENT DOCUMENTS

DE            202 02 053      7/2002
WO      WO 2006/033617 A1   3/2006

*Primary Examiner*—Boyer D Ashley
*Assistant Examiner*—Sara Addisu
(74) *Attorney, Agent, or Firm*—Drinker Biddle & Reath LLP

(57) ABSTRACT

A cutting tool, and a loose top therefore, includes two parts detachably connected to each other via a threaded joint in which co-operating male and female threads are included in the form of helicoidal ridges. The profile shape of each helicoidal ridge is defined by a top and two flanks, which delimit a helicoidal groove having a bottom. The first flank is inclined in relation to a center axis of the tool at a first angle that is smaller than a second angle of the second flank in relation to the center axis. Accordingly, the thread ridge is reinforced in comparison with thread ridges having a symmetrical profile shape, whereby larger tensile forces than compressive forces can be applied to the threaded joint while avoiding damage to the thread ridges.

10 Claims, 5 Drawing Sheets

U.S. PATENT DOCUMENTS

| | | |
|---|---|---|
| 6,485,220 B2 | 11/2002 | Hecht |
| 6,494,648 B2 * | 12/2002 | Harpaz ........................ 407/30 |
| 7,004,692 B2 * | 2/2006 | Hecht ......................... 408/233 |
| 7,341,409 B2 * | 3/2008 | Jonsson et al. .............. 408/233 |
| 2006/0062642 A1 * | 3/2006 | Jonsson et al. .............. 408/233 |
| 2006/0072977 A1 * | 4/2006 | Jonsson et al. .............. 408/233 |

* cited by examiner

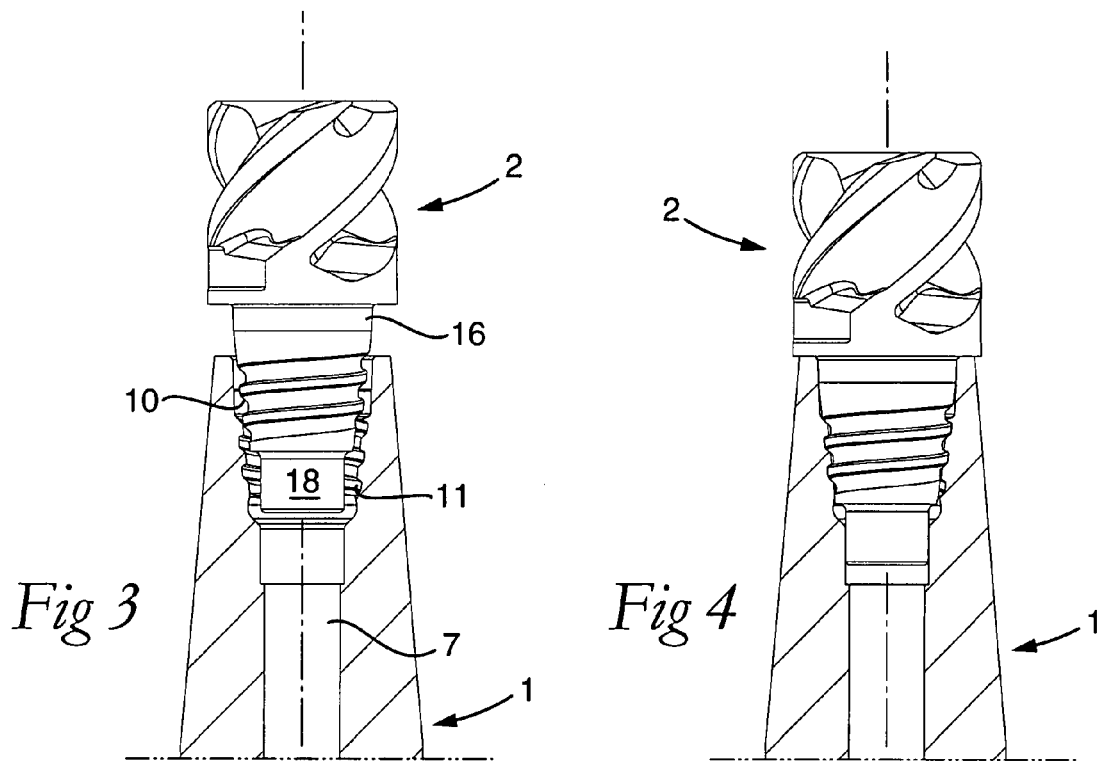
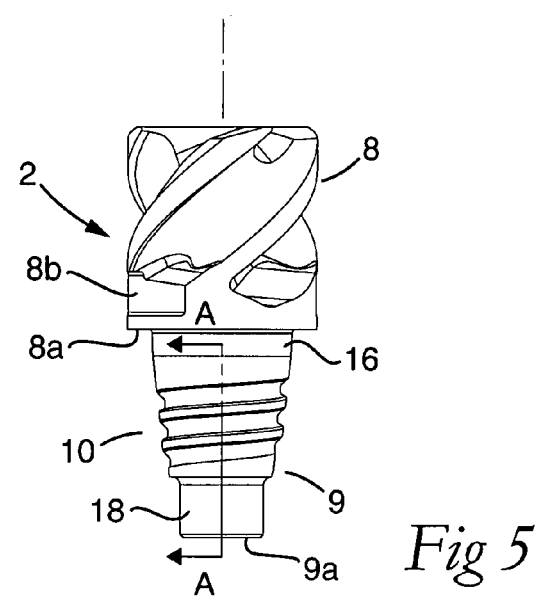

TOOL FOR CHIP REMOVING MACHINING AS WELL AS A PART AND THREADED JOINT THEREFOR

CROSS-REFERENCE TO RELATED APPLICATIONS

This application claims priority under 35 U.S.C. §119 to Sweden Application No. 0600875-9, filed on Apr. 20, 2006, the disclosure of which is incorporated by reference herein in its entirety.

BACKGROUND OF THE INVENTION

1. Field of the Invention

In a first aspect, this invention relates to a tool intended for chip removing or cutting machining and of the type that includes two parts oriented along a common center axis and detachably connected to each other via a threaded joint. The threaded joint includes, on one hand, a female thread positioned in the vicinity of a mouth in a hollow space in one of the parts, and on the other hand a male thread positioned in the vicinity of a free end of a male-like pin included in the other part. The individual thread includes a helicoidal ridge, which has a top and a pair of opposite flanks, which delimit a likewise helicoidal groove having a bottom. A first flank of the male thread ridge, which faces away from the end of the pin, is pressed against a first flank of the female thread ridge, which faces away from the mouth of the hollow space, in connection with screwing-in of the pin into the hollow space. And the second flank of the male thread ridge, which faces the free end of the pin, is pressed against a second flank of the female thread ridge, which faces the mouth, in connection with unscrewing of the pin.

In another aspect, the invention also relates to a detachable part for such tools.

In practice, tools of this type may be used for machining work pieces of metal, such as steel and steel alloys, iron, aluminium, titanium, etc.

2. Description of Related Art

Related rotatable cutting tools include two parts connected via an interface or joint. For example, a basic body and a cutting body or wear part are detachably connected together. In practice, such tools may be in the form of drills or milling cutters, e.g., shank-end or profile mills. In modern machine tools, the basic bodies are so expensive that they, for economical reasons, cannot be integrated with the cutting body, which is a wear part and therefore has a limited service life. In other words, it is profitable to make the proper cutting body in the form of a separate unit, which those skilled in the art usually refer to as a "loose top," and which can be exchanged after wear, while the basic body can be utilized for a longer time.

The development of loose-top tools for rotary machining has lately been intense and resulted in a number of different tool constructions, which differ from each other primarily in respect to the interface or the joint between the loose top and the basic body. It is believed that insofar as loose-top tools have been the object of a large number of proposals for design solutions, is per se evidence of the design of the interface between the loose top and the basic body is a technical problem that is difficult to master. Thus, consideration has to be given to a number of different difficulties, which are based not only on the circumstance that the loose top and the basic body are manufactured from different materials and in production units separated from each other, but also on the circumstance that the tools should operate under severe external conditions, such as strong heat release, the influence from large cutting forces, and the like. In particular, such small tools as shank-end and profile mills are subjected to a variety of different stresses, which vary most considerably in different functional states. Thus, the loose top, i.e., the hard, detachable cutting body of, for instance, a profile mill, is subjected not only to axial tensile and compressive forces, respectively, but also to miscellaneous radial forces acting at different angles to the loose top. Therefore, to form a practically working interface or joint between a loose top and a basic body becomes a delicate balance between a number of, at times conflicting, desires.

In related tools, threaded joints have been used with varying success in order to connect the loose top with the basic body. Usually, a rear, male-like pin is formed on the loose top having a conical or cylindrical male thread, which can be screwed into a corresponding female thread in a hollow space, which mouths in a front end of the basic body. In related tools, the rear pin of the loose top is formed with external, cylindrical guide surfaces in front of and behind the male thread of the pin. When the male thread is tightened in the female thread of the basic body, the guide surfaces are brought into engagement with internal, cylindrical guide surfaces in front of and behind, respectively, the female thread with the purpose of stably anchoring the loose top, and above all, counteracting deflection of the same, when it is subjected to radial stresses. In one related tool, a threaded joint has conical threads. Characteristic of this threaded joint is that the top of one of the threads should have surface contact with the groove bottom of the other thread with the purpose of anchoring the loose top and counteracting deflection of the same. In theory, this is an attractive idea, so far that the number of co-operating guide surfaces can be reduced. However, in practice, the manufacture of the two tool parts requires too a high dimensional accuracy in order for a serial production to be at least economically realistic. In a related cutting tool, the loose top includes a single conical guide surface adjacent to the male thread of the pin.

Common to all previously known threaded joints for cutting tools, is that the force by which the threads force the loose top to move axially is equally large upon screwing-in (when the threads act pullingly) as upon unscrewing (when the threads act pressingly), and that the threads may be deformed if they are overloaded by too powerful tightening.

BRIEF SUMMARY OF THE INVENTION

The present invention relates to overcoming the disadvantages of the above-mentioned related cutting tools that make use of threaded joints between two detachably connected parts, and providing an improved tool. Therefore, a tool is provided that includes a threaded joint that has improved properties in respect of the its capacity of generating large tightening forces without jeopardizing the durability of the thread ridges. In other words, there is provided a tool threaded joint that optimizes the utilization of the material of the individual thread ridges in such a way that the pulling flank of the male thread can transfer large tensile forces to the female thread, while avoiding damage to the thread ridges. Additionally, there is provided a tool including a threaded joint that allows a quick and simple connection and separation, respectively, of the two parts of the tool. In a particular aspect, there is provided a rotatable tool, the two parts of which are a basic body and a loose top, wherein the loose top may be anchored in a stable way in the basic body and in spite of this allow quick and simple exchanges.

In accordance with an aspect of an embodiment of the invention, there is provided a tool for chip removing machining. The tool includes first and second parts oriented along a common center axis, and a threaded joint detachably connecting the first and second parts to each other. The threaded joint includes a female thread disposed in a mouth of a hollow space in the first part, a male thread disposed on a free end of a male-like pin on the second part, and an individual thread.

The individual thread includes a helicoidal ridge that has a profile shape that is defined by a top and two flanks, which delimit a likewise helicoidal groove that has a bottom. A first flank of the male thread ridge, which faces away from the free end of the pin, and a first flank of the female thread ridge, which faces away from the mouth of the hollow space, press against one another during screwing-in of the pin into the hollow space. A second flank of the male thread ridge, which faces the free end of the pin, and a second flank of the female thread ridge, which faces the mouth, press against one another during unscrewing of the pin out of the hollow space. The first flanks of the male and female thread ridges are inclined in relation to the center axis at a first angle that is smaller than a second angle at which the second flanks are inclined in relation to the center axis.

In accordance with another aspect of an embodiment of the invention, there is provided a part for a tool for chip removing machining. The part includes a male thread that is disposed adjacent to a free end of a male-like pin, which extends along a center axis. The male thread includes a helicoidal ridge that has a peripheral top and a pair of opposite flanks, which delimit a helicoidal groove that has a bottom. A first one of the pair of opposite flanks faces the free end of the pin and is inclined in relation to the center axis at a first angle that is smaller than an inclination of a second angle of a second one of the pair of opposite flanks in relation to the center axis.

In accordance with yet another aspect of an embodiment of the invention, there is provided a threaded joint that detachably connects first and second parts to each other along a common center axis. The first part defines a mouth of a hollow space, and the second part includes a male-like pin that extends to a free end. The threaded joint includes a female thread disposed in the hollow space of the first part, and a male thread disposed on the male-like pin of the second part. The female thread includes a female helicoidal ridge that has a first profile shape defined by first and second flanks of the female helicoidal ridge that are disposed on opposite sides of a first peripheral top and that delimit a female helicoidal groove, which has a first bottom. The first flank of the female helicoidal ridge faces away from the mouth of the hollow space, and the second flank of the female helicoidal ridge faces the mouth of the hollow space. The male thread includes a male helicoidal ridge that has a second profile shape defined by first and second flanks of the male helicoidal ridge that are disposed on opposite sides of a second peripheral top and that delimit a male helicoidal groove, which has a second bottom. The first flank of the male helicoidal ridge faces away from the free end of the male-like pin, and the second flank of the male helicoidal ridge faces the free end of the male-like pin. The first flank of the male helicoidal ridge and the first flank of the female helicoidal ridge press against one another during screwing-in of the pin into the hollow space, and the second flank of the male helicoidal ridge and the second flank of the female helicoidal ridge press against one another during unscrewing of the pin out of the hollow space. The first flanks of the male and female helicoidal ridges are inclined in relation to the center axis at a first angle, and the second flanks of the male and female helicoidal ridges are inclined in relation to the center axis at a second angle that is greater than the first angle.

In accordance with a further aspect of an embodiment of the invention, there are formed two co-operating thread ridges of a threaded joint with different flanks. In particular, the first flanks of the respective ridges, which act pullingly in connection with screwing-in, are given a flank angle that is smaller than the flank angles of the second flanks, which act pressingly in connection with unscrewing. In such a way, the individual thread ridge obtains a proportion-wise greater amount of material (extra material) in the area inside the pressing flank, i.e., the thread ridge is reinforced in the area of the pressing flank. Accordingly, the resulting tensile-force applied to the thread ridge upon screwing-in is absorbed and distributed in the reinforcing extra material. An advantageous consequence is that larger tensile forces than compressive forces can be applied to the threaded joint while avoiding damage to the thread ridges.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 3 is a partially sectioned side view showing a pin included in the loose top and having a male thread partly inserted into a hollow space in the basic body provided with a female thread.

FIG. 4 is an analogous side view showing the loose top tightened having the male thread thereof in full engagement with the female thread of the basic body.

FIG. 5 is a side view of only the loose top.

FIG. 9 is a longitudinal section showing the co-operation of the male thread with the female thread during screwing-in.

DETAILED DESCRIPTION OF THE PREFERRED EMBODIMENTS

Figure 1:
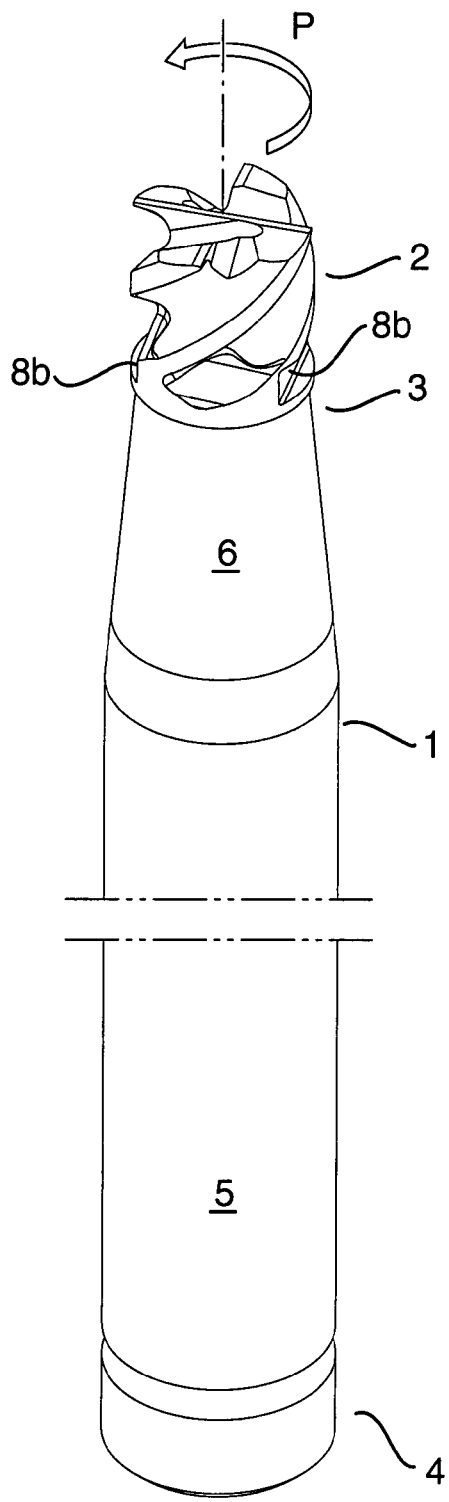
FIG. 1 is a partly sectioned perspective view showing two parts in the form of a shank-end mill according to an embodiment of a cutting tool.
Figure 2:
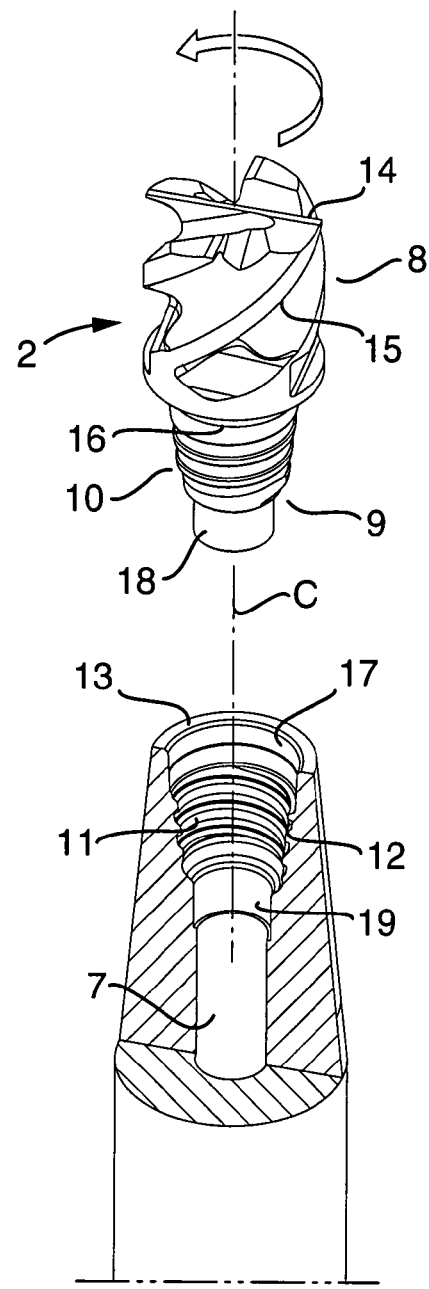
FIG. 2 is a perspective exploded view showing a loose top included in the tool and spaced-apart from a partly sectioned basic body of the cutting tool shown in FIG. 1.
Figure 6:
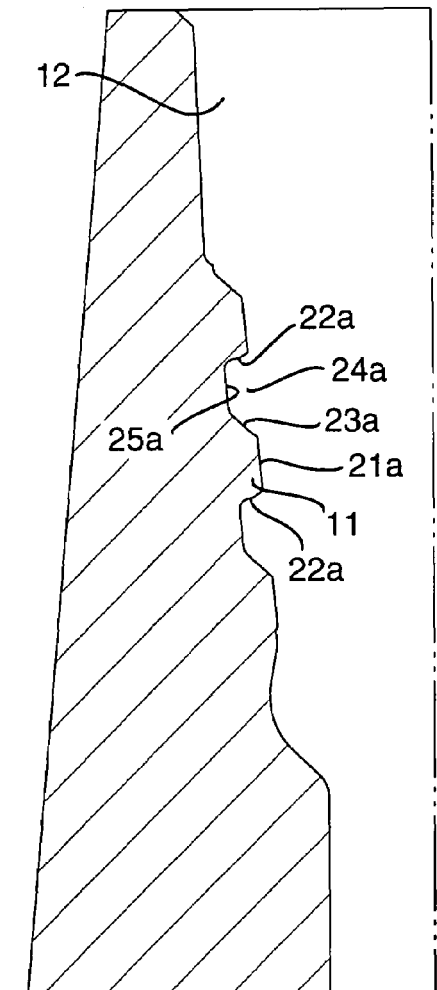
FIG. 6 is an enlarged longitudinal section through a portion of the basic body, showing the profile shape of the female thread.

FIGS. 1 and 2 show a tool intended for chip removing machining of, for example, metallic work pieces. The tool includes two parts, e.g., a basic body 1 and a so-called loose top 2 in the form of a milling-cutter body, that are detachably connected to each other via a threaded joint. As shown, the basic body 1 has a long narrow shape and includes front and rear ends 3,4. The shape of the basic body 1 is characterized in that it is rotationally symmetrical, e.g., the outside of the basic body 1 includes a cylindrical surface 5 as well as a conical surface 6. The basic body 1 may be tubular by including a central through hole 7 (see FIG. 2), although the basic body may alternatively be solid.

The loose top 2 includes a front head 8 and a rear pin 9. A male thread 10 is formed on the rear pin 9 and arranged to co-operate with a female thread 11 in a hollow space 12, which mouths in the front end 3 of the basic body 1. This mouth is surrounded by a ring-shaped shoulder surface 13 that may be planar. The head 8 of the loose top is formed with a number of cutting edges 14,15. Some of the cutting edges 15 may be helicoidal and extend along an imaginary, rotationally symmetrical envelope surface, other cutting edges 14 may be straight and situated in an end plane of the front head 8.

As best seen in FIG. 5, the head 8 has a rear, ring-shaped contact surface 8a, which seats against the shoulder surface 13. Furthermore, two planar surfaces 8b may be formed in the front head 8 in order to form a key grip.

The loose top 2 and the basic body 1 are oriented along a common center axis C, and the assembly may be rotated in the direction of the arrow P (see FIGS. 1 and 2).

In the illustrated exemplary embodiment, the two threads 10,11 have a conical basic shape. Furthermore, a pair of co-operating guide surfaces 16,17 are situated in front of the respective threads and have a rotationally symmetrical shape. For example, the guide surfaces 16,17 may be cylindrical and precisely fit in relation to each other.

In the example, co-operating guide surfaces 18,19 also have a rotationally symmetrical shape, e.g., cylindrical, and are disposed behind the respective threads. The surfaces 18,19 may also have a relatively precise fit in relation to each other, although here, the requirement of dimensional accuracy may be somewhat less than for the front guide surfaces 16,17.

Alternatively, the fit between the front guide surfaces 16,17 may advantageously be a press fit such that the diameter of the surface 16 is slightly larger than the inner diameter of the guide surface 17.

An advantage of threads 10, 11 having a basic conical shape, as compared with cylindrical shape, is that the male thread 10 may be inserted a good distance into the female thread 11 before the threads are brought into engagement with each other, as is seen in FIG. 3. This means that the male thread 10 only needs to be rotated one or a few thread turns in order to finally be tightened in the female thread 11. Thus, from the state shown in FIG. 3, the loose top 2 only needs to be rotated about 1.5 turns in order to reach the finally tightened state thereof, as is seen in FIG. 4.

Figure 7:
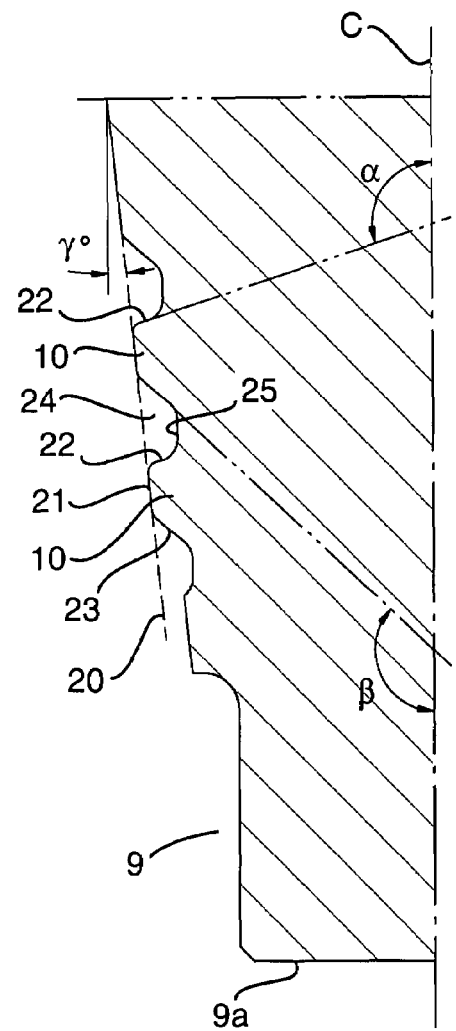
FIG. 7 is an enlarged longitudinal section through a portion of the pin of the loose top showing the profile shape of the male thread.

Turning now to FIGS. 6-10, FIG. 6 illustrates the design of the female thread 11 and FIG. 7 illustrates the design of the male thread 10. In FIG. 7, an imaginary generatrix 20, which defines the generally conical (or truncated conical) shape of the male thread 10, extends at an angle γ, also referred to as the cone angle. As shown, the cone angle γ is approximately 6°. The thread 10, also called a helicoidal ridge 10, has a profile shape defined by a top 21 and by two flanks 22,23, which delimit a likewise helicoidal groove 24 having a bottom 25.

In an analogous manner, the female thread includes a thread ridge 11, has a profile shape defined by a top 21a and two flanks 22a,23a, which delimit a helicoidal groove 24a having a bottom 25a. A first flank 22 of the male thread ridge 10, which is turned from the free end 9a of the pin 9, presses against a co-operating first flank 22a of the female thread ridge 11 when the male thread 10 is to be screwed into the female thread 11. The flank 22a is turned from the mouth of the hollow space 12. Upon unscrewing, the second flank 23 of the male thread ridge 10 presses against a second co-operating flank 23a of the female thread ridge 11. Because the first flanks 22,22a act pullingly in connection with screwing-in, the same may alternatively be referred to as "pulling flanks," while the flanks 23,23a may alternatively be referred to as "pressing flanks."

The respective pulling flanks 22,22a for an individual thread ridge are inclined in relation to the center axis C at an angle α that is smaller than the angle β of the pressing flanks 23,23a with respect to the center axis C.

In the exemplary embodiment as shown, the angle α is approximately 108° and the angle β is approximately 129°. However, the angles α and β are not limited to these angular values. In particular, the flank angle α of the pulling flank 22 of the male thread ridge 10 may be at least 100° and may be at most 120°. Advantageously, the angle α may be in the range of 104-115°. The corresponding flank angle of the pulling flank 22a of the female thread ridge 11 should correspond with the flank angle of the pulling flank 22 of the male thread ridge 10, irrespective of the definite value thereof. Accordingly, surface contact is guaranteed between the pulling flanks 22,22a upon screwing-in.

The flank angles β of the pressing flanks 23,23a are at least equally large as angle α, and may deviate from the above-mentioned angle of 129°. In practice, angle β may be at least 115° (with angle α smaller than 115°) and should not exceed 150°. Advantageously, the angle β should be within the range of 120 to 140°, or 124 to 134°. In practice, angle β may be at least 15° larger than angle α.

Since the need for surface contact between the pressing flanks 23,23a is smaller than the need for surface contact between the pulling flanks 22,22a, the flank angles of the pressing flanks 23,23a could differ. In particular, the flank angle of the pressing flank 23a could be somewhat larger than the flank angle of the pressing flank 23.

Figure 8:
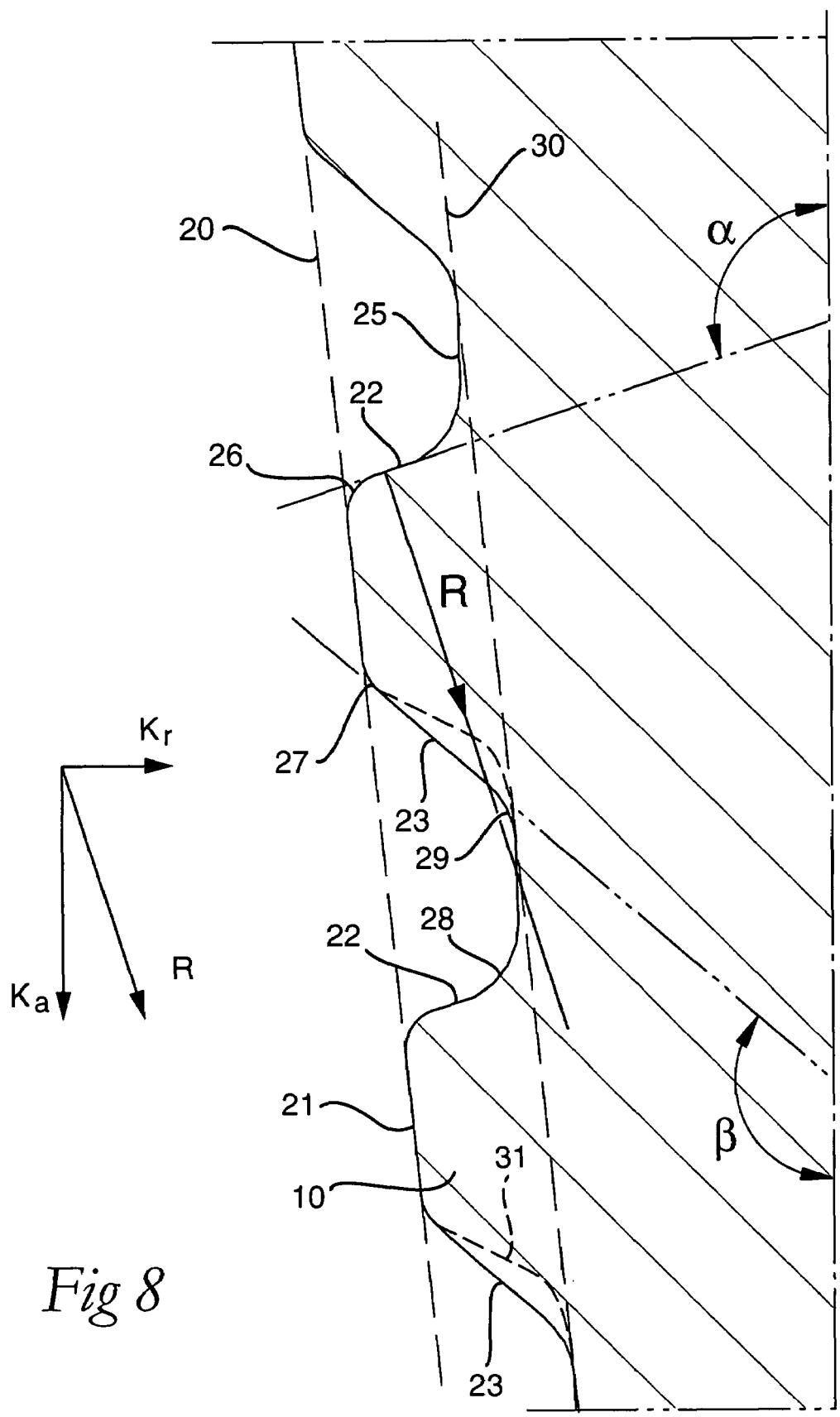
FIG. 8 is a further enlarged longitudinal section showing a number of thread ridges included in the male thread.

Reference is now made to FIG. 8, which in even more detail illustrates the design of the male thread ridge 10. The section in FIG. 8, as well as the section in FIG. 7, is viewed in the axial section plane A-A in FIG. 5.

As may be best seen in FIG. 8, the top 21 of the thread ridge 10 is a surface having a certain width determined by the length of the straight line that forms a portion of generatrix 20 defining the imaginary cone surface. The top surface 21 transforms into the flanks 22,23 via convex transition surfaces 26,27. In an analogous manner, the flanks 22,23 transform into the bottom 25 of the groove via round transition surfaces 28,29, which in this case are concave. In the example, the groove 24 has the same depth along the entire length thereof by virtue of the groove bottom 25 being tangent to a generatrix 30, which is parallel to the generatrix 20.

By means of dashed lines 31, a flank of an imaginary thread profile is outlined, which is conceived to be symmetrical so far that the flank angles are equally large on both sides of the thread ridge. By forming the pressing flank 23 with a larger flank angle than the pulling flank 22, a reinforcement is provided adjacent to the pressing flank 23 as a consequence of the extra surface area of material present on the real flank 23 as compared to the imaginary flank 31. The resulting force, which acts against the thread ridge 10 in connection with screwing-in, is designated R, which is a vector sum of the axial component $K_a$ and the radial component $K_r$. Thanks to the extra reinforcing material on the pressing flank 23, the force R can be absorbed and distributed along a considerably larger surface area than if the thread ridge had a conventional, symmetrical shape, i.e., imaginary flank 31.

Figure 9:
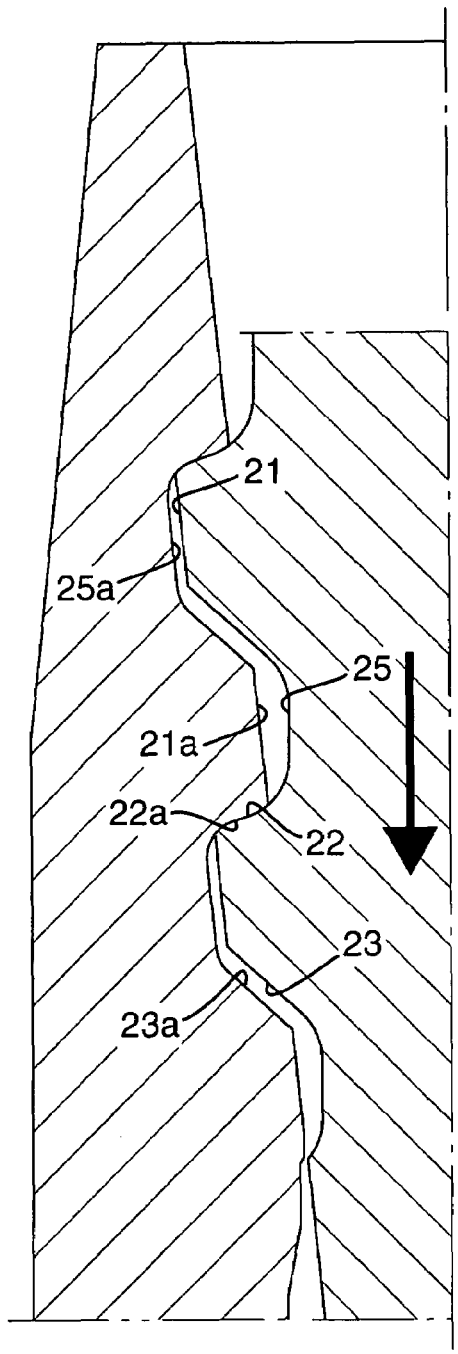
Figure 10:
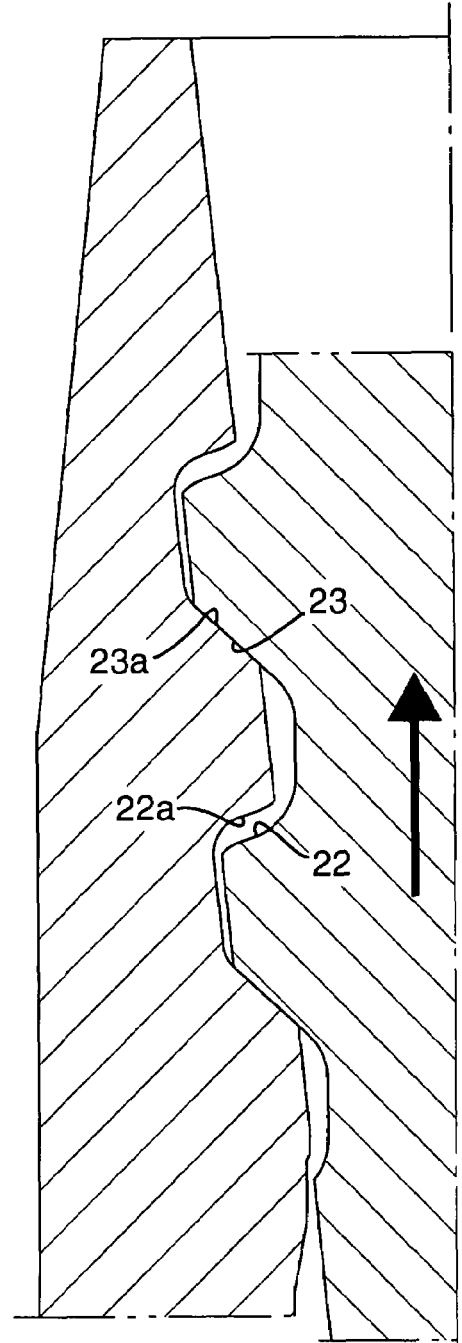
FIG. 10 is a longitudinal section showing the co-operation of the male thread with the female thread during unscrewing.

Generally, the groove 24a of the female thread 11 has a profile that is larger than the profile of the male thread ridge 10, whereby play arises between the threads. This is best seen in FIGS. 9 and 10, wherein FIG. 9 illustrates the threaded joint in connection with screwing-in and FIG. 10 illustrates the same in connection with unscrewing. In both cases, there is a play between the top 21,21a of the individual thread ridge and the groove bottom 25,25a into which the respective thread ridge protrudes. Upon screwing-in according to FIG. 9, the pulling flank 22 of the male thread ridge 10 presses against the pulling flank 22a of the female thread ridge 11, while the pressing flanks 23,23a lack contact with each other. Upon unscrewing according to FIG. 10, the opposite relationship applies, i.e., the pressing flank 23 of the male thread ridge 10 presses against the pressing flank 23a of the female thread ridge 11, while the pulling flanks 22,22a lack contact with each other.

By forming the two threads with an unsymmetrical profile as described above, reinforcement is accomplished on the side of the thread ridge that has to absorb the tensile force (irrespective of whether this is the active force in the male thread ridge 10 or the counter force in the female thread ridge 11). Accordingly, the threaded joint is able to resist larger tensile forces than the compressive force required to unscrew the loose top 2. In other words, the function of the threaded joint is optimized, i.e., a stable fixation of the loose top 2 is provided by means of a large clamping force, which avoids damaging the thread ridges, is more important than a large compressive force for unscrewing. Here, it should be pointed out that unscrewing generally can be effected at a more moderate force than screwing-in, in particular when the threads have a conical basic shape. Another advantage of the described, exemplary embodiment of the threaded joint is that the same can be realized with few thread turns (in practice between 3 and 5), and that tightening and loosening, respectively, can be carried out by short, limited rotary motions (1 or 2 turns of rotation).

In the exemplified embodiment, in which the tool is in the form of a shank-end mill, the loose top 2 may, in its entirety, be made from a single hard material, such as cemented carbide, while at least the front part of the basic body 1 may be manufactured from a relatively softer material, e.g., steel.

Alternatively, the unique threaded joint may also be utilized to detachably connect other parts included in cutting tools, i.e., other than just a loose top and a rotatable basic body. The male thread may include cemented carbide and the material of the female thread may include steel, as described above, or alternatively the two threads may be manufactured of the same or similar materials, e.g., steel. Also, the geometry of the two co-operating threads may be modified in various ways. For example, the threads may have a conical basic shape, as discussed above, or alternatively the basic shape of the threads may be cylindrical. Moreover, if the threads are conical, the cone angle may vary upward as well as downward from 6°. Further, the number of thread turns and the thread pitch, respectively, may vary. Also, special guide surfaces in front of and/or behind the two threads may be omitted, even in the case of the exemplified shank-end mill. Furthermore, the requisite play between the male and female threads may vary, e.g., depending on the type of tool that includes the threaded joint. Moreover, the number of starts of the threads may vary.

Thus, in a rotatable tool, e.g., a shank-end mill, a threaded joint is made self-locking when the threads are provided in such a manner that the transfer of torque between the tool parts tends to screw the male thread into the female thread.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A tool for chip removing machining, comprising:
   a first part and a second part oriented along a common center axis; and
   a threaded joint detachably connecting the first and second parts to each other, the threaded joint including:
      a female thread disposed in a mouth of a hollow space in the first part; and
      a male thread disposed on a free end of a male-like pin on the second part; wherein
      each of the male and female threads includes a helicoidal ridge having a profile shape being defined by a top and two flanks, which delimit a likewise helicoidal groove having a bottom,
      a first flank of the male thread ridge facing away from the free end of the pin and a first flank of the female thread ridge facing away from the mouth of the hollow space pressing against one another during screwing-in of the pin into the hollow space,
      a second flank of the male thread ridge facing the free end of the pin and a second flank of the female thread ridge facing the mouth pressing against one another during unscrewing of the pin out of the hollow space,
      the first flanks of the male and female thread ridges being inclined in relation to the center axis at a first angle that is smaller than a second angle at which the second flanks are inclined in relation to the center axis,
      the second flank of the male thread ridge facing the free end of the pin and the second flank of the female thread ridge facing the mouth being spaced from one another during screwing-in of the pin into the hollow space, and
      the first flank of the male thread ridge facing away from the free end of the pin and the first flank of the female thread ridge facing away from the mouth of the hollow space being spaced from one another during unscrewing of the pin out of the hollow space.

2. A tool according to claim 1, wherein the first angle of the first flanks in relation to the center axis is at least 100°.

3. A tool according to claim 1, wherein the first angle of the first flanks in relation to the center axis is at most 120°.

4. A tool according to claim 1, wherein the second angle of the second flanks in relation to the center axis is at least 115°.

5. A tool according to claim 1, wherein the second angle of the second flanks in relation to the center axis is at most 150°.

6. A tool according to claim 1, wherein at least the first angles of the first flanks of the two male and female thread ridges are equally large.

7. A tool according to claim 1, wherein the second angles of the second flanks of the male and female thread ridges are equally large.

8. A tool according to claim 1, wherein the second part comprises a wear part including a hard, wear-resistant material, and the first part comprises a basic body including a relatively softer material, and the second part includes the male thread on the pin.

9. A tool according to claim 8, wherein the wear part comprises a milling-cutter body, and the basic body comprises a rotatable shaft.

10. A tool according to claim 9, wherein the male-like pin of the milling-cutter body comprises first and second external, rotationally symmetrical guide surfaces disposed axially fore and aft, respectively, of the male thread, and the hollow space of the shaft comprises first and second internal, rotationally symmetrical guide surfaces disposed aft and fore, respectively, of the female thread, wherein the first external guide surface co-operatively engages the first internal guide surface and the second external guide surface co-operatively engages the second internal guide surface.

* * * * *